United States Patent [19]

Luhm

[11] Patent Number: 5,599,147
[45] Date of Patent: Feb. 4, 1997

[54] BLIND RIVET WITH A TAPERED LOCKING MECHANISM

[75] Inventor: Ralph Luhm, La Habra, Calif.

[73] Assignee: Allfast Fastening Systems, Inc., City of Industry, Calif.

[21] Appl. No.: 432,823

[22] Filed: May 2, 1995

[51] Int. Cl.⁶ .................................................. F16B 13/04
[52] U.S. Cl. ................................. 411/38; 411/34; 411/69
[58] Field of Search .................................. 411/34, 43, 44, 411/69, 70, 38

[56] References Cited

U.S. PATENT DOCUMENTS

| | | |
|---|---|---|
| Re. 20,055 | 8/1936 | Huck . |
| Re. 21,058 | 4/1939 | Huck . |
| 1,120,411 | 12/1914 | Rohmer ............................. 411/69 |
| 2,061,628 | 11/1936 | Huck . |
| 2,385,886 | 10/1945 | Shaff . |
| 2,538,623 | 1/1951 | Keating . |
| 2,545,752 | 3/1951 | Singleton . |
| 2,546,602 | 3/1951 | Keating . |
| 2,652,741 | 9/1953 | Ketchum et al. . |
| 2,756,624 | 7/1956 | Austin . |
| 3,038,626 | 6/1962 | Simmons . |
| 3,178,989 | 4/1965 | Siebol . |
| 3,257,890 | 6/1966 | Kraemer . |
| 3,285,121 | 11/1966 | Siebol . |
| 3,292,482 | 12/1966 | Fry et al. . |
| 3,300,798 | 1/1967 | York . |
| 3,309,747 | 3/1967 | Smith . |
| 3,348,444 | 10/1967 | Brignola . |
| 3,515,419 | 6/1970 | Baugh . |
| 3,553,040 | 1/1971 | Bell . |
| 3,643,544 | 2/1972 | Massa . |
| 3,880,042 | 4/1975 | Binns . |
| 3,937,123 | 2/1976 | Matuschek et al. . |
| 4,044,591 | 8/1977 | Powderley ............................. 411/69 |
| 4,074,608 | 2/1978 | Siebol . |
| 4,089,249 | 5/1978 | Binns . |
| 4,137,817 | 2/1979 | Siebol . |
| 4,168,650 | 9/1979 | Dahl et al. . |
| 4,170,919 | 10/1979 | Siebol . |
| 4,170,920 | 10/1979 | Siebol . |
| 4,211,145 | 7/1980 | Dolch . |
| 4,222,304 | 9/1980 | Yoshida et al. . |
| 4,230,017 | 10/1980 | Angelosanto . |
| 4,261,245 | 4/1981 | Mauer . |
| 4,293,258 | 10/1981 | McKewan . |
| 4,312,613 | 1/1982 | Binns . |
| 4,355,934 | 10/1982 | Denham et al. . |
| 4,364,697 | 12/1982 | Binns . |
| 4,367,994 | 1/1983 | Francis et al. . |
| 4,370,081 | 1/1983 | Briles . |
| 4,388,031 | 6/1983 | Rodgers . |
| 4,451,189 | 5/1984 | Pratt ............................. 411/70 |
| 4,473,914 | 10/1984 | Haft . |
| 4,556,351 | 12/1985 | Wollar et al. . |

(List continued on next page.)

FOREIGN PATENT DOCUMENTS 472329 9/1937 United Kingdom ................. 411/70

Primary Examiner—Flemming Saether
Attorney, Agent, or Firm— Blakely Sokoloff Taylor and Zafman

[57] ABSTRACT

A blind rivet fastener which has a bulb forming collar that is assembled by sliding the collar down the shank of the fastener stem. The bulb collar is seated adjacent to the head of the stem. The stem has a shoulder and a pull portion that extend through the inner channel of a sleeve. The sleeve, shoulder and stem head are typically inserted into the matching holes of two workpieces. The sleeve has a head located at an accessible side of the workpieces and an opposite chamfered end located at an inaccessible "blind" side of the workpieces. The fastener is installed by holding the sleeve while pulling the shoulder through the sleeve channel. The stem head pushes the bulb collar, which engages the chamfered end of the sleeve. The bulb collar has an inwardly tapered end which bends the sleeve in a radially outward direction. The deformed end and sleeve head secure the sleeve to the workpieces. The fastener also has a locking collar which is bent by the moving stem into corresponding grooves of the sleeve and stem. The stem is pulled until the serrated pull portion breaks away from the stem shoulder.

4 Claims, 3 Drawing Sheets

U.S. PATENT DOCUMENTS

| | | |
|---|---|---|
| 4,579,491 | 4/1986 | Kull . |
| 4,580,936 | 4/1986 | Francis et al. . |
| 4,585,383 | 4/1986 | Kraemer . |
| 4,609,315 | 9/1986 | Briles . |
| 4,609,317 | 9/1986 | Dixon et al. . |
| 4,615,655 | 10/1986 | Dixon . |
| 4,620,825 | 11/1986 | Potzas . |
| 4,627,775 | 12/1986 | Dixon . |
| 4,639,174 | 1/1987 | Denham et al. . |
| 4,678,384 | 7/1987 | Sparling et al. . |
| 4,696,610 | 9/1987 | Wright . |
| 4,702,655 | 10/1987 | Kendall . |
| 4,736,560 | 4/1988 | Murphy . |
| 4,765,787 | 8/1988 | Briles . |
| 4,781,500 | 11/1988 | Mauer . |
| 4,781,501 | 11/1988 | Jeal et al. . |
| 4,784,551 | 11/1988 | Kendall . |
| 4,789,283 | 12/1988 | Crawford . |
| 4,826,372 | 5/1989 | Kendall . |
| 4,836,728 | 6/1989 | Mauer et al. . |
| 4,850,771 | 7/1989 | Hurd . |
| 4,859,128 | 8/1989 | Brecz et al. . |
| 4,863,325 | 9/1989 | Smith . |
| 4,865,499 | 9/1989 | Lacey . |
| 4,877,363 | 10/1989 | Williamson et al. . |
| 4,900,205 | 2/1990 | Sadri . |
| 4,907,922 | 3/1990 | Jeal et al. . |
| 4,909,687 | 3/1990 | Bradley et al. . |
| 4,919,576 | 4/1990 | Louw et al. . |
| 4,950,115 | 8/1990 | Sadri . |
| 4,958,971 | 9/1990 | Lacey et al. . |
| 4,968,198 | 11/1990 | Binns . |
| 4,987,003 | 1/1991 | Schuster et al. . |
| 4,988,247 | 1/1991 | Summerlin . |
| 4,990,042 | 2/1991 | Szayer et al. . |
| 5,006,024 | 4/1991 | Siebol . |
| 5,030,050 | 7/1991 | Auriol et al. . |
| 5,044,850 | 9/1991 | Getten et al. . |
| 5,135,340 | 8/1992 | Stinson ................................ 411/34 |
| 5,141,373 | 8/1992 | Kendall . |
| 5,197,838 | 3/1993 | Schwab . |
| 5,320,465 | 6/1994 | Smith . |
| 5,346,348 | 9/1994 | Denham . |

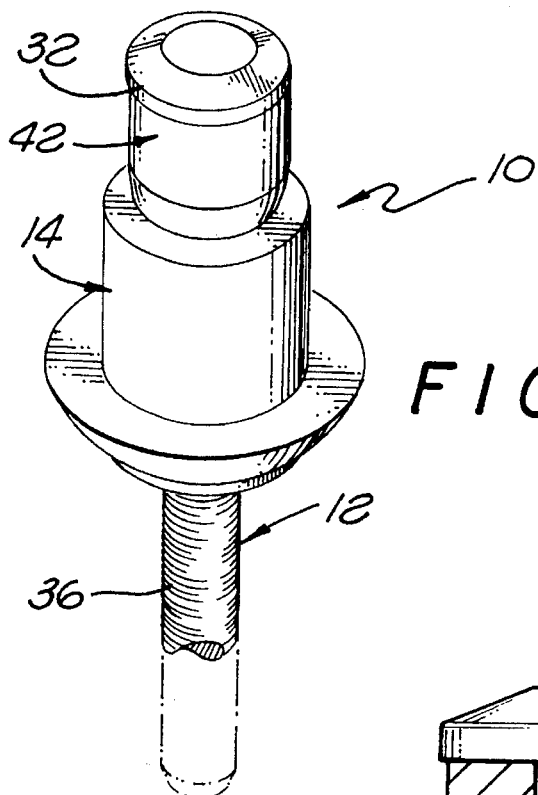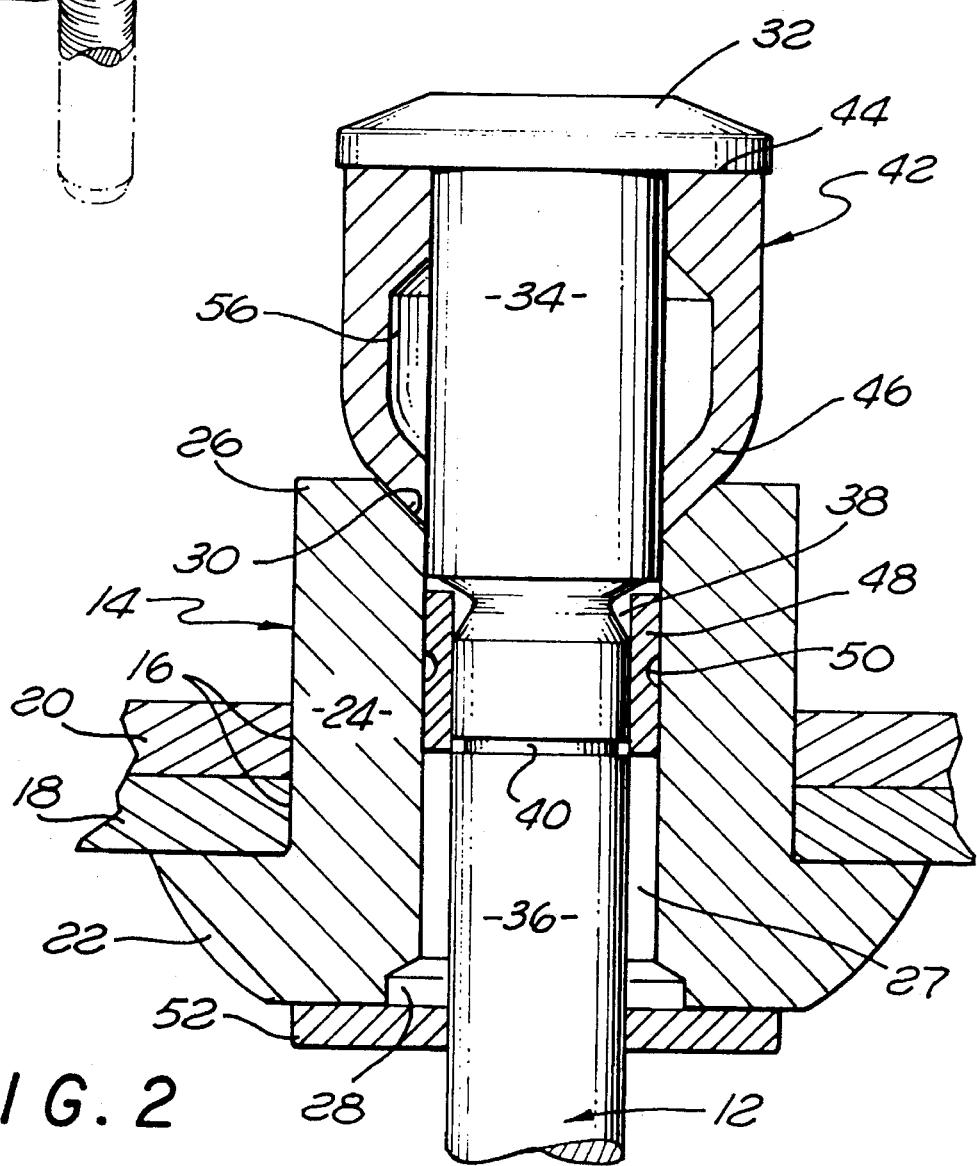

BLIND RIVET WITH A TAPERED LOCKING MECHANISM

BACKGROUND OF THE INVENTION

1. Field of the Invention

The present invention relates to a blind rivet fastener.

2. Description of Related Art

Rivets are commonly used to fasten together two workpieces. Conventional solid rivets are pressed into corresponding holes of the workpieces by placing an anvil on one end of the rivet and pressing the opposite end of the rivet with a hammer. The installation of solid rivets requires access to both sides of the combined workpieces.

There does exist assemblies that do not allow access to both sides of the combined workpieces. For example, the inner chamber of an aircraft fuel tank is not accessible when the tank is being sealed. To properly seal the tank, there has been developed "blind" rivet fasteners which can be installed from only one side of the workpieces.

A typical blind rivet fastener assembly has a sleeve that is inserted into matching holes of the workpieces. The sleeve has a head on the accessible side of the workpieces. Extending through the inner channel of the sleeve is a stem. The stem contains a head, a shoulder and a serrated pull portion. The stem head is located on the inaccessible side of the workpieces.

The fastener is installed by holding the sleeve while pulling the serrated portion and stem shoulder through the inner sleeve channel. The stem head typically has a tapered shoulder or a separate collar that bends the end of the sleeve in a radially outward direction. The deformed sleeve forms a bulb on the inaccessible blind side of the workpieces. The bulb and the sleeve head fasten the sleeve to the workpieces. The fastener assembly may further have a locking ring which bends and secures the stem to the sleeve. The rivet stem is pulled until the locking features prevent further movement of the stem and the serrated pull portion breaks away from the shoulder.

U.S. Pat. No. 5,052,870 issued Pratt et al. and assigned to Textron, Inc., discloses a blind rivet fastener which has a shear ring that is adjacent to the blind end of the sleeve. When the stem is pulled through the sleeve channel, the shear ring deforms the sleeve to create a bulb. The shear ring and sleeve typically have matching tapered surfaces that induce the outward deformation of the sleeve.

The shear ring of the Textron fastener has an inner annular flange that is located within an outer annular groove of the stem. The inner annular flange shears from the ring to limit the amount of clamping compression of the workpieces. The inner diameter of the shear ring annular flange is smaller than the outer diameter of the stem shoulder. For this reason, the Textron product is assembled by bending the shear ring around the circumference of the stem. The bending process increases the cost of producing the assembly. It would be desirable to provide a blind rivet fastener which has a bulb forming collar that does not have to be bent around the stem to assemble the fastener.

SUMMARY OF THE INVENTION

The present invention is a blind rivet fastener which has a bulb forming collar that is assembled by merely sliding the collar down the shank of the fastener stem. The bulb collar is seated adjacent to the head of the stem. The stem has a shoulder and a pull portion that extend through the inner channel of a sleeve. The sleeve, shoulder and stem head are typically inserted into the matching holes of two workpieces. The sleeve has a head located at an accessible side of the workpieces and an opposite chamfered end located at an inaccessible "blind" side of the workpieces. The fastener is installed by holding the sleeve while pulling the shoulder through the sleeve channel. The stem head pushes the bulb collar, which engages the chamfered end of the sleeve. The bulb collar has an inwardly tapered end which bends the sleeve in a radially outward direction. The deformed end and sleeve head secure the sleeve to the workpieces. The fastener also has a locking collar which is bent by the moving stem into corresponding grooves of the sleeve and stem. The stem is pulled until the serrated pull portion breaks away from the stem shoulder.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1 is a perspective view of a blind rivet fastener of the present invention;

FIG. 2 is a cross-sectional view of the blind rivet fastener placed into matching holes of two workpieces;

DETAILED DESCRIPTION OF THE INVENTION

Figure 3A:
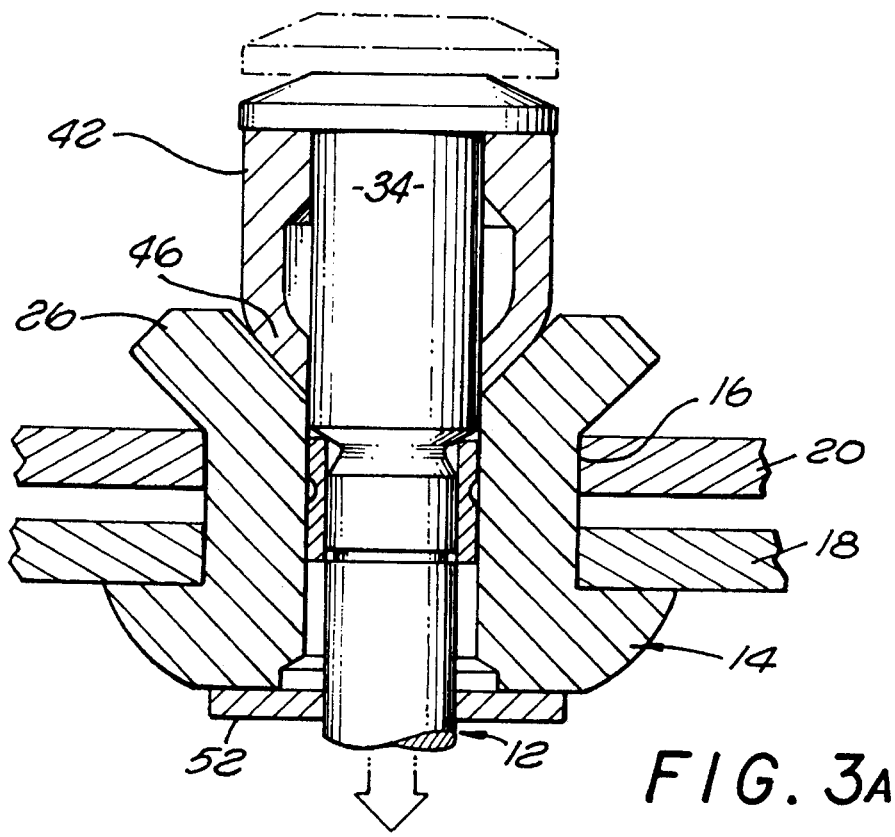
FIG. 3a is a cross-sectional view showing a sleeve being deformed by a bulb collar of the fastener.

Referring to the drawings more particularly by reference numbers, FIG. 1 shows a blind rivet fastener 10 of the present invention. The fastener 10 is typically used to attach two workpieces, wherein one side of the workpieces is not accessible to the installation tool. Although the fastener 10 is described and shown as a blind rivet, it is to be understood that the fastener can be used even when both sides of the workpieces are accessible to the installation tool.

As shown in FIG. 2, the fastener 10 includes a stem 12 that extends through a sleeve 14. The sleeve 14 is typically inserted into matching holes 16 of a first workpiece 18 and a second workpiece 20. The sleeve 14 has a head 22 located adjacent to the outer surface of the first workpiece 18. The outer first workpiece surface is typically accessible to an installation tool. Extending from the head 22 is a shank 24 that extends through the holes 16 of the workpieces. The shank 24 has one end 26 that extends from the outer surface of the second workpiece 20. The outer second workpiece surface is typically the "blind" or inaccessible side of the workpieces. The sleeve 14 further has a center channel 27 that extends through the longitudinal axis of the member 14. Concentric with the center channel 27 is an inner annular groove 28 located at the end of the sleeve head 22. The opposite end of the sleeve 14 has an inner annular chamfer surface 30.

The stem 12 has a head 32 located adjacent to a shoulder 34. Extending from the shoulder 34 is a pull portion 36. The pull portion 36 is preferably serrated to provide a grabbing surface for an installation tool. Located at the base of the pull portion 36 is a locking groove 38. The stem 12 also has a break groove 40.

Extending around the stem shoulder 34 is a bulb collar 42. The bulb collar 42 has an end face 44 that is seated against the underside of the stem head 32. The bulb collar 42 also has an inwardly tapered end section 46. The tapered angle of the end section 46 typically corresponds to the chamfered angle of the sleeve 14.

The fastener 10 further contains a locking collar 48 located between the stem 12 and the sleeve 14. The locking collar 48 preferably has an outer annular notch 50 that defines a bending point for the collar 48. The fastener 10 may also include an anvil plate 52 that is used to maintain the position of the sleeve 14 while the stem 12 is pulled through the channel 26.

To assemble the fastener 10, the stem 12 is inserted into the bulb collar 42 until the end face 44 is seated on the stem head 32. The tapered section 46 of the collar 42 can be either preformed or formed after assembly to the stem 12. After the bulb collar 42 is assembled, the stem 12 is inserted through the locking collar 48. The locking collar 48 and stem 12 are then inserted through the sleeve 14. The anvil plate 52 is slipped onto the stem 12 to complete the assembly.

As shown in FIG. 3a, the fastener 10 is installed into the workpieces by placing the sleeve 14 and stem into the holes 16 and pulling the stem 12 through the sleeve 14. The workpieces 18 and 20 are typically separated by a gap. The stem 12 is pulled by an installation tool (not shown) which also provides a counterforce on the anvil plate 52 to hold the sleeve 14 in position while the stem 12 is being pulled therethrough.

Figure 3B:
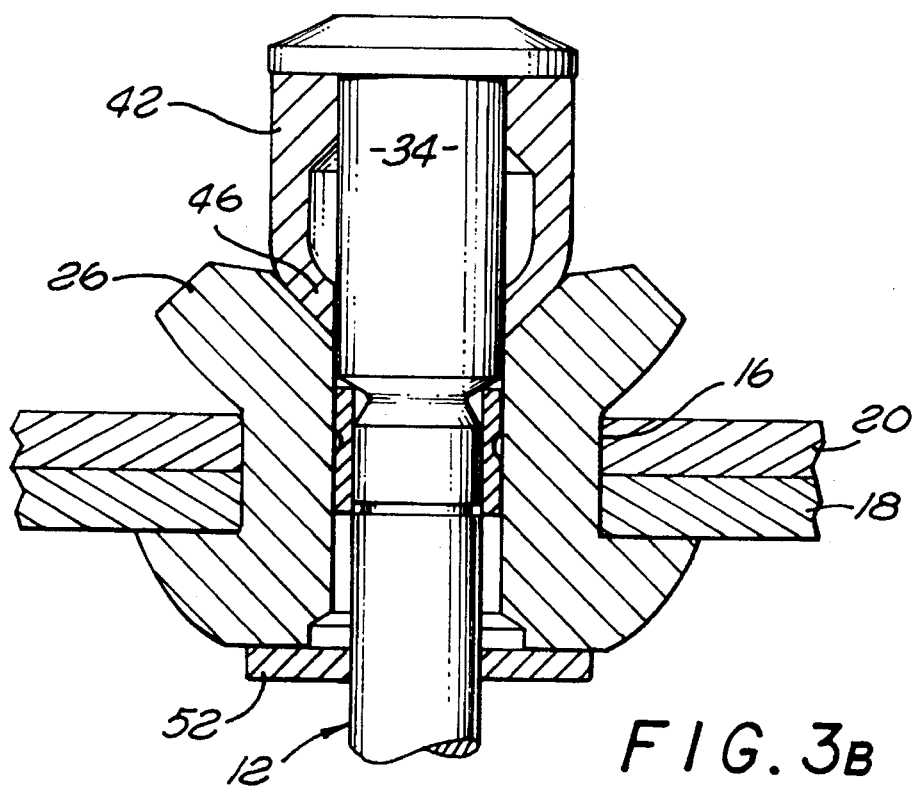
FIG. 3b is a cross-sectional view of the blind rivet clasping the workpieces.

As shown in FIG. 3b, pulling the stem 12 causes the bulb collar 42 to push against the sleeve 14. The tapered end section 46 of the bulb collar 42 pushes the end 26 of the sleeve 14 in a radially outward direction. The tapered surface 46 of the collar 42 provides a normal force that has vector components in both the radial and axial directions of the fastener. The radial force component pushes the sleeve 14 outward pulling together the workpieces 18 and 20. The axial force component drives the collar 42 downward.

Figure 4A:
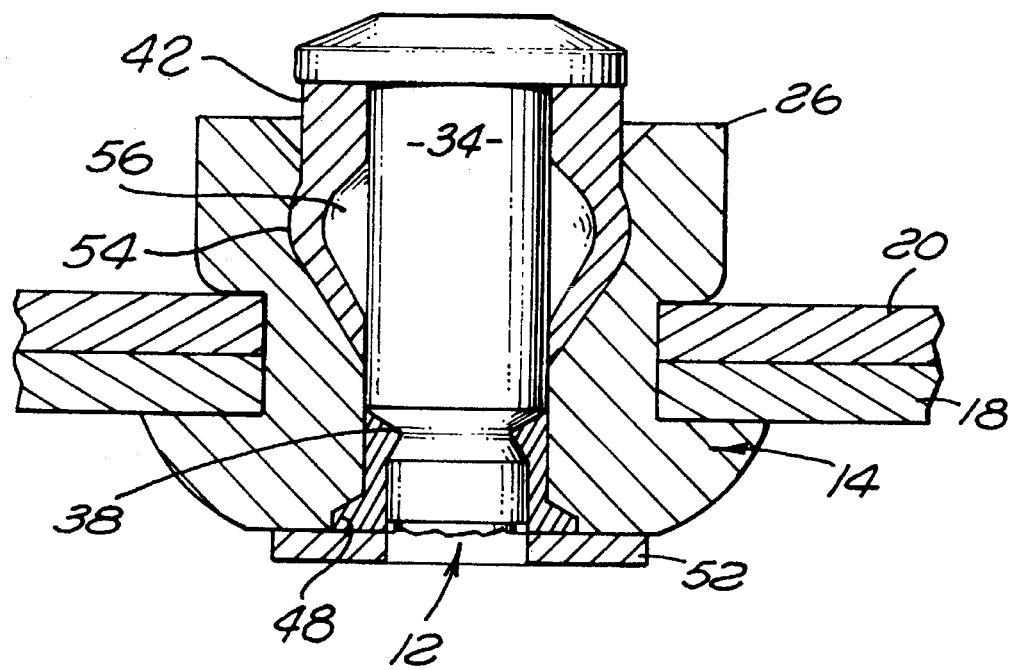
FIG. 4a is a cross-sectional view showing a locking collar being bent into a lock position and a serrated pull portion of the fastener broken away from the shoulder of the stem.

As shown in FIG. 4a, further movement of the stem 12 moves the locking collar 48 into the anvil plate 52. The locking collar 48 bends about the notch 50 into the annular groove 28 of the sleeve 14 and the locking groove 38 of the stem 12. The tapered and cylindrical sections of the bulb collar 42 create a deformation of the sleeve 14 that corresponds to the shape of the collar 42.

The locking engagement of the bulb collar 42 and the locking collar 48 eventually impede the movement of the stem 12. The installation tool continues to pull the stem 12 until the pull portion 36 breaks from the shoulder 34 at the break groove 40. The bulb collar 42 creates a "bulb" in the sleeve 14 which together with the sleeve head 22 secures the sleeve 14 to the workpieces. The bending of the locking collar 48 into both the locking groove 38 and the annular groove 28 locks the stem 12 into the sleeve 14. The elbow portion of the tapered collar section 46 typically bends during the installation of the rivet to create a protrusion 54 that additionally limits relative movement between the stem 12 and the sleeve 14. The yielding of the tapered elbow collar section 46 also limits the amount of compressive forces applied by the fastener onto the workpieces. The collar 42 is provided with an inner cavity 56 that allows said tapered section 46 to bend.

Figure 4B:
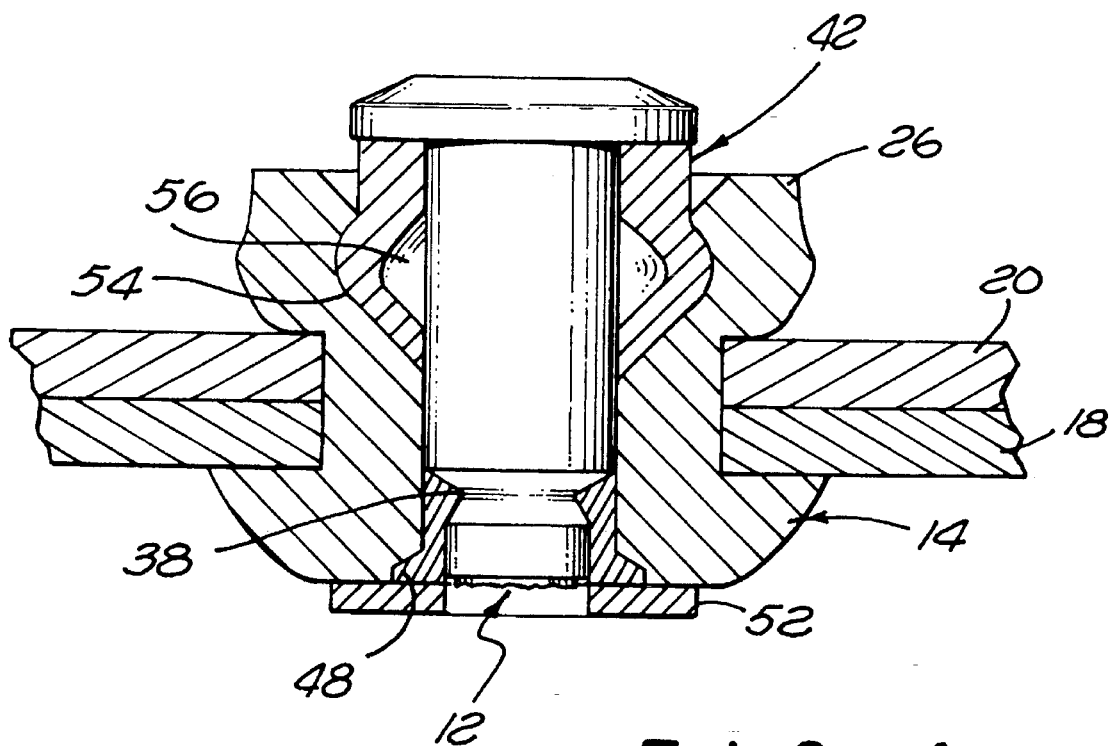
FIG. 4b is a cross-sectional view similar to FIG. 4a showing an installed rivet with a maximum grip.

FIG. 4b shows a blind rivet that is installed with a maximum grip, wherein the collar 42 and sleeve 14 undergo greater deformation than what occurs during a minimum grip installation shown in FIG. 4a. The type of grip will vary depending upon the thicknesses of the workpieces, length of the rivet assembly and tolerances. For example, the maximum grip shown in FIG. 4b may occur when the workpieces have a combined thickness that is greater than the workpieces shown in FIG. 4a. The bulb collar 42 compensates for the different types of grips by varying the bend of the tapered end 46. The tapered end 46 will have a greater bend for the maximum grip than the minimum grip.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A blind rivet fastener, comprising:

a sleeve that has a shank that extends from a head and an opening that extends through said sleeve, said sleeve having a longitudinal axis;

a stem that extends through said sleeve opening, said stem having a shoulder, a head located at a first end of said shoulder, and a pull portion located at an opposite second end of said shoulder that can be grasped to pull said stem through said sleeve;

a bulb collar located adjacent to said stem shoulder, said bulb collar having a first end adjacent to said stem head and an opposite inwardly tapered second end that engages and deforms said sleeve when said stem is pulled through said sleeve, said bulb collar has an inner cavity that allows said inwardly tapered second end to deflect in an outward direction essentially perpendicular to the longitudinal axis of said sleeve and toward said head in a direction essentially parallel with the longitudinal axis of said sleeve when said stem is pulled through said sleeve; and, a locking device that cooperates with said stem and said head to lock said shoulder in place when said stem is pulled through said sleeve.

2. The fastener as recited in claim 1, wherein said sleeve has an inner chamfered surface that engages said tapered second end of said bulb collar.

3. The fastener as recited in claim 1, wherein said locking device is a locking collar that bends into a locking groove of said stem and an inner groove of said sleeve.

4. A blind rivet fastener, comprising:

a sleeve that has an opening extending therethrough, a head located at one end of said sleeve and a shank that extends form said head and which has an inwardly chamfered surface located at an opposite second end of said sleeve, said head also having an inner groove adjacent to said opening, said sleeve having a longitudinal axis;

a stem that extends through said sleeve opening, said stem having a shoulder, a head located at a first end of said shoulder and a pull portion located at an opposite second end of said shoulder that can be grasped to pull said stem through said sleeve, said stem further having a locking groove adjacent to said shoulder and said pull portion;

a bulb collar located adjacent to said shoulder, said bulb collar having a first end adjacent to said stem head and an opposite inwardly tapered second end that engages said chamfered surface of said sleeve to form a bulb in said sleeve when said stem is pulled through said sleeve, said bulb collar has an inner cavity that allows said tapered end to deflect in an outward direction essentially perpendicular to the longitudinal axis of said sleeve and toward said head in a direction essentially parallel with the longitudinal axis of said sleeve when said stem is pulled through said sleeve; and, a locking collar that bends into said stem locking groove and said sleeve inner groove to lock said stem shoulder in place when said stem is pulled through said sleeve.

* * * * *

UNITED STATES PATENT AND TRADEMARK OFFICE
CERTIFICATE OF CORRECTION

PATENT NO.    : 5,599,147
DATED         : February 4, 1997
INVENTOR(S)   : Ralph Luhm It is certified that error appears in the above-identified patent and that said Letters Patent is hereby corrected as shown below:

Title page,
Item [56], References Cited, under U.S. PATENT DOCUMENTS, insert
-- 5,052,870    10/1991    Pratt    411/43 --.

Signed and Sealed this

Twenty-seventh Day of August, 2002

Attest:

Attesting Officer

JAMES E. ROGAN
Director of the United States Patent and Trademark Office